United States Patent [19]

Thodiyil

[11] Patent Number: 5,691,910
[45] Date of Patent: Nov. 25, 1997

[54] GENERIC GATE LEVEL MODEL FOR CHARACTERIZATION OF GLITCH POWER IN LOGIC CELLS

[75] Inventor: John A. Thodiyil, Sunnyvale, Calif.

[73] Assignee: LSI Logic Corporation, Milpitas, Calif.

[21] Appl. No.: 661,186

[22] Filed: Jun. 10, 1996

[51] Int. Cl.$^6$ .................................................. G06F 17/50
[52] U.S. Cl. .......................... 364/483; 364/488; 364/489
[58] Field of Search ........................... 364/488, 489, 364/490, 491, 578, 483; 395/500; 327/263

[56] References Cited

U.S. PATENT DOCUMENTS

| | | | |
|---|---|---|---|
| 4,656,580 | 4/1987 | Hitchcock, Sr. et al. | 364/200 |
| 4,698,760 | 10/1987 | Lembach et al. | 364/490 |
| 4,924,430 | 5/1990 | Zasio et al. | 364/578 |
| 5,274,568 | 12/1993 | Blinne et al. | 364/489 |
| 5,446,676 | 8/1995 | Huang et al. | 364/578 |
| 5,452,225 | 9/1995 | Hammer | 364/488 |
| 5,473,548 | 12/1995 | Omori et al. | 364/489 |
| 5,521,834 | 5/1996 | Crafts et al. | 364/489 |
| 5,548,526 | 8/1996 | Misheloff | 364/491 |
| 5,559,715 | 9/1996 | Misheloff | 364/488 |

OTHER PUBLICATIONS

"Efficient Estimation of Dynamic Power Consumption under a Real Delay Model", Tsui et al., PROC 1993 IEEE ACM INT CONF COMPUT AIDED DES, Nov. 7, 1993.
"Accurate Estimation of Combinational Circuit Activity", Mehta et al., PROC DES AUTOM CONF, Jun. 12, 1995.
"Estimation of Power Dissipation in CMOS Combinational Circuits", Devadas et al., Proceedings of the IEEE 190 Custom Integrated Circuits Conference, May 13, 1990.
"Maximum Power Estimation for CMOS Circuits Under Arbitrary Delay Model", Wang et al., 1996 IEEE International Symposium on Circuits and Systems, May 12, 1996.
"PECS: A Peak Current and Power Simulator for CMOS Combinational Circuits", Lam et al., 1996 IEEE International Symposium on Circuits and Systems, May 12, 1996.

Primary Examiner—James P. Trammell
Assistant Examiner—Tony M. Cole
Attorney, Agent, or Firm—Matthew G. Reeves

[57] ABSTRACT

According to the present invention, there is provided a method for determining glitch power in a logic circuit having a power supply terminal, a first input, a second input, and an output coupled to a capacitive load. In one embodiment, the method includes: determining at least one ramp time sum, each ramp time sum corresponding to a pair of ramp times; determining a plurality of separation times by: selecting a minimum separation time, selecting a maximum separation time, dividing a difference between the minimum separation time and the maximum separation by a step value to determine a separation time increment, incrementing the minimum separation time by multiples of the separation time increment until the incremented minimum separation time approximately equals the maximum separation time; determining an average current flowing through the power supply terminal for each separation time and ramp time sum; storing the average current in a computer-readable medium; and interpolating an actual average current from the stored average current values based upon actual ramp times and an actual separation time.

6 Claims, 8 Drawing Sheets

| C = 500ff | tw = 2.0ns | | |
|---|---|---|---|
| C = 50ff | tw = 2.ons | | |
| ts = | 0.1 / Tra<br>1.9   Trb | 1.0 / Tra<br>1.0   Trb | 1.9 / Tra<br>0.1   Trb |
| -4.3 | | | |
| ⋮ | ⋮ | ⋮ | ⋮ |
| 2.3 | | | |

FIG. 3c

*** FILE SWEEP_ND2DATA ***

| DATA D1 | | | | | |
|---|---|---|---|---|---|
| tw | ts | Tsa | Tra | Tsb | Trb |
| 0.500000NS | -1.900000NS | 5.000000NS | 0.100000NS | 3.200000NS | 0.400000NS |
| 0.500000NS | -1.720000NS | 5.000000NS | 0.100000NS | 3.380000NS | 0.400000NS |
| 0.500000NS | -1.540000NS | 5.000000NS | 0.100000NS | 3.560000NS | 0.400000NS |
| 0.500000NS | -1.360000NS | 5.000000NS | 0.100000NS | 3.740000NS | 0.400000NS |
| 0.500000NS | -1.180000NS | 5.000000NS | 0.100000NS | 3.920000NS | 0.400000NS |
| 0.500000NS | -1.000000NS | 5.000000NS | 0.100000NS | 4.100000NS | 0.400000NS |
| 0.500000NS | -0.820000NS | 5.000000NS | 0.100000NS | 4.280000NS | 0.400000NS |
| 0.500000NS | -0.640000NS | 5.000000NS | 0.100000NS | 4.460000NS | 0.400000NS |
| 0.500000NS | -0.460000NS | 5.000000NS | 0.100000NS | 4.640000NS | 0.400000NS |
| 0.500000NS | -0.280000NS | 5.000000NS | 0.100000NS | 4.820000NS | 0.400000NS |
| 0.500000NS | -0.100000NS | 5.000000NS | 0.100000NS | 5.000000NS | 0.400000NS |
| 0.500000NS | 0.080000NS | 5.000000NS | 0.100000NS | 5.180000NS | 0.400000NS |

ENDDATA

FIG. 4

```
****** FILE VALIDATE_NDZCS ********

GLITCH MODELING AB:10=>01 LOAD 50FF
.TEMP 25
.PARAM Tsa=5.192200NS
.PARAM Tra=0.050000NS
.PARAM Tsb=5.000000NS
.PARAM Trb=0.050000NS
.PARAM MEAS_START=35.0NS
.PARAM MEAS_END=55.0NS
.GLOBAL 0

.LIB /home/aix/p25/lpat_modeling/bsim500k.modlib BSIM500KNOM
.LIB /home/aix/p25/lpat_modeling/lcb500k.iclib ND2C .TRAN 0.0INS 60NS START=0.0NS SWEEP DATA=DI
.INC'/home/aix/p25/lpat_modeling/glitch_study/utils/sweep_nd2dam

XI  Z A  B  PWR ND2C
CI  Z 0  50FF
VI  99 PWR DC=0.0
V2  99 0 DC=3.3

*AB: 10=>01
VA  A  0 PULSE(3.3 0 Tsa Tra Tra 20NS 4ONS)
VB  B  0 PULSE(0 3.3 Tsb Trb Trb 20NS 4ONS)

.MEAS TRAN AVG_CURR AVG I(VI)  FROM=MEAS_START TO=MEAS_END
.MEAS TRAN RMS_CURR RMS I(VI)  FROM=MEAS_START TO=MEAS_END
.MEAS TRAN PP_CURR  PP  I(VI)  FROM=MEAS_START TO=MEAS_END

.ALTER CHANGE LOAD FROM 50FF to 500FF && KEEP AB:10=>01
CI  Z 0 500FF

.ALTER CHANGE to AB:01=>10 & RESET LOAD TO 50FF
CI Z 0 50FF
VA  A  0 PULSE(0 3.3 Tsa Tra Tra 20NS 40NS)
VB  B  0 PULSE(3.3 0 Tsb Trb Trb 20NS 40NS)

.ALTER CHANGEto AB;01=>10 & CHANGE LOAD FROM 50FFto 500FF
CI Z 0 500FF
VA  A  0 PULSE(0 3.3 Tsa Tra Tra 20NS 40NS)
VB  B  0 PULSE(3.3 0 Tsb Trb Trb 20NS 40NS)

.END
```

FIG. 5

GENERIC GATE LEVEL MODEL FOR CHARACTERIZATION OF GLITCH POWER IN LOGIC CELLS

BACKGROUND

This invention relates generally to the characterization for power analysis of semiconductor devices and, more particularly, to a method and apparatus useful in determining glitch power in semiconductor logic cells.

A wide variety of tools are available to semiconductor circuit designers to aid them in design and analysis of the logic circuits required to implement complex integrated circuits. In designing and analyzing logic circuits, numerous performance parameters such as power consumption, signal propagation delays, and timing characteristics must be considered by the designers.

One specific parameter is the power consumption of the logic cell during a glitching arc. A glitch is defined as an event where more than one input to the logic cell changes, but the output of the logic cell is not changed. Of course, it is to be understood that depending on the differences of the arrival times of the changing inputs, the output may change transiently to some voltage level that is intermediate to the two logic levels, or it may switch completely before returning to the original state.

Conventional methods for determining the glitch power consumption of a logic cell are based on inertial, or transport, timing models. Such models merely estimate the glitch power and, therefore, do not always provide sufficiently accurate results to satisfy the design accuracy requirements. Accurate methods for determining glitch power do exist for transistor level models, but these are not practical at the logic cell level because of the CPU run time and memory requirements needed for making the necessary calculations for the numerous transistors involved.

Therefore, it is an object of the present invention to provide a fast and accurate method for determining glitch power in a logic cell. Other objectives and advantages of the present invention will become apparent in view of the following disclosure and appended claims.

SUMMARY OF THE INVENTION

According to the present invention, there is provided a method for determining glitch power in a logic circuit having a power supply terminal, a first input, a second input, and an output coupled to a capacitive load. In one embodiment, the method includes: determining at least one ramp time sum, each ramp time sum corresponding to a pair of ramp times; determining a plurality of separation times by: selecting a minimum separation time, selecting a maximum separation time, dividing a difference between the minimum separation time and the maximum separation by a step value to determine a separation time increment, incrementing the minimum separation time by multiples of the separation time increment until the incremented minimum separation time approximately equals the maximum separation time; determining an average current flowing through the power supply terminal for each separation time and ramp time sum; storing the average current in a computer-readable medium; and interpolating an actual average current from the stored average current values based upon actual ramp times and an actual separation time.

BRIEF DESCRIPTION OF THE DRAWINGS

FIG. 3C is a representation of a data structure according to an embodiment of the invention.

FIG. 4 is an excerpt of sweep file data according to an embodiment of the invention.

FIG. 5 is a SPICE deck suitable for use in an embodiment of the invention.

DETAILED DESCRIPTION OF EMBODIMENTS OF THE INVENTION

Figure 1:
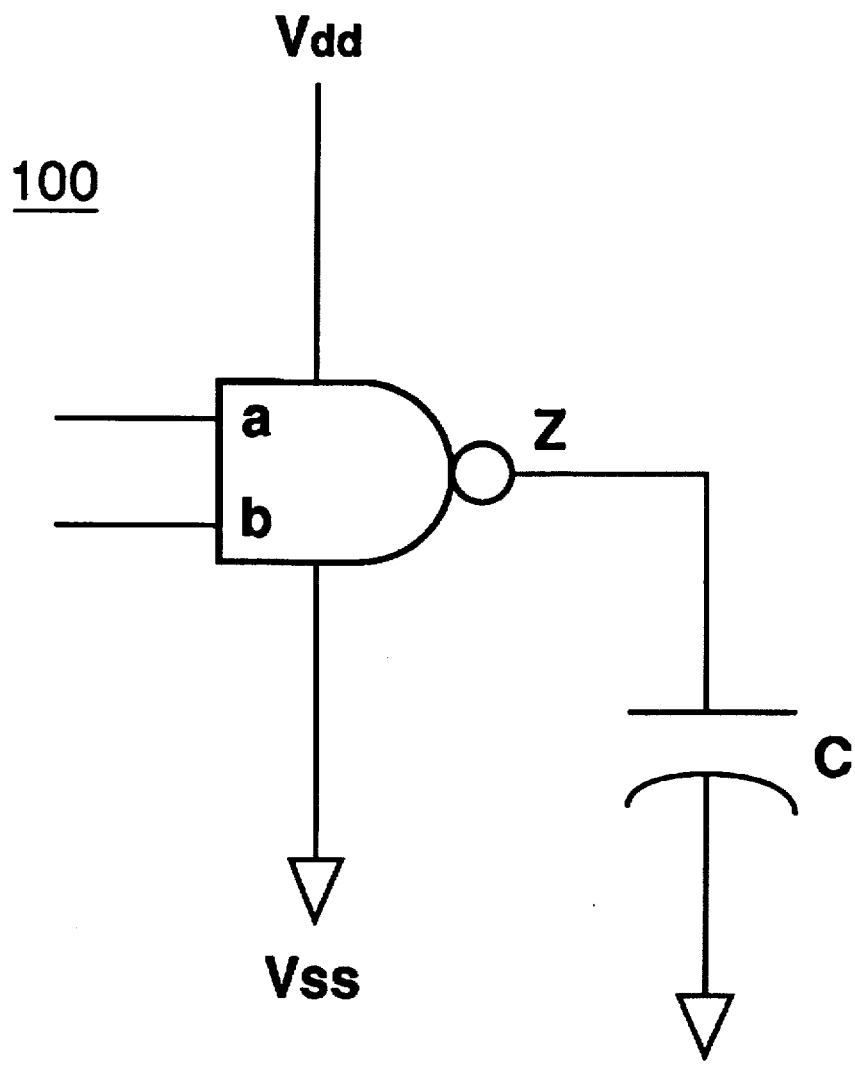
FIG. 1 is a logic gate used to illustrate embodiments of the invention.

In one embodiment, a method for determining glitch power in logic circuits is provided. For purposes of illustration, the method will be described with respect to the logic circuit 100 shown in FIG. 1 which is a simple NAND gate. As shown, the logic circuit 100 includes a power supply terminal Vdd, a pair of inputs, denoted input a and input b, and an output z. The output z is coupled to a capacitive load c. It will be appreciated that the present invention is easily adaptable to more complex logic circuits which have numerous inputs and outputs, however, for purposes of illustration, the NAND gate shown in FIG. 1 is sufficient. Multiple changing inputs are collapsed into two dominant changing inputs and this model becomes applicable. The dominance is determined by the relative timing of the changing inputs.

There are essentially two input timings which are critical to the glitch power dissipation. The parameters that affect the glitch power are the arrival times of the changing inputs, the slope of the changing inputs, and the capacitive load at the glitching output.

Figure 2:
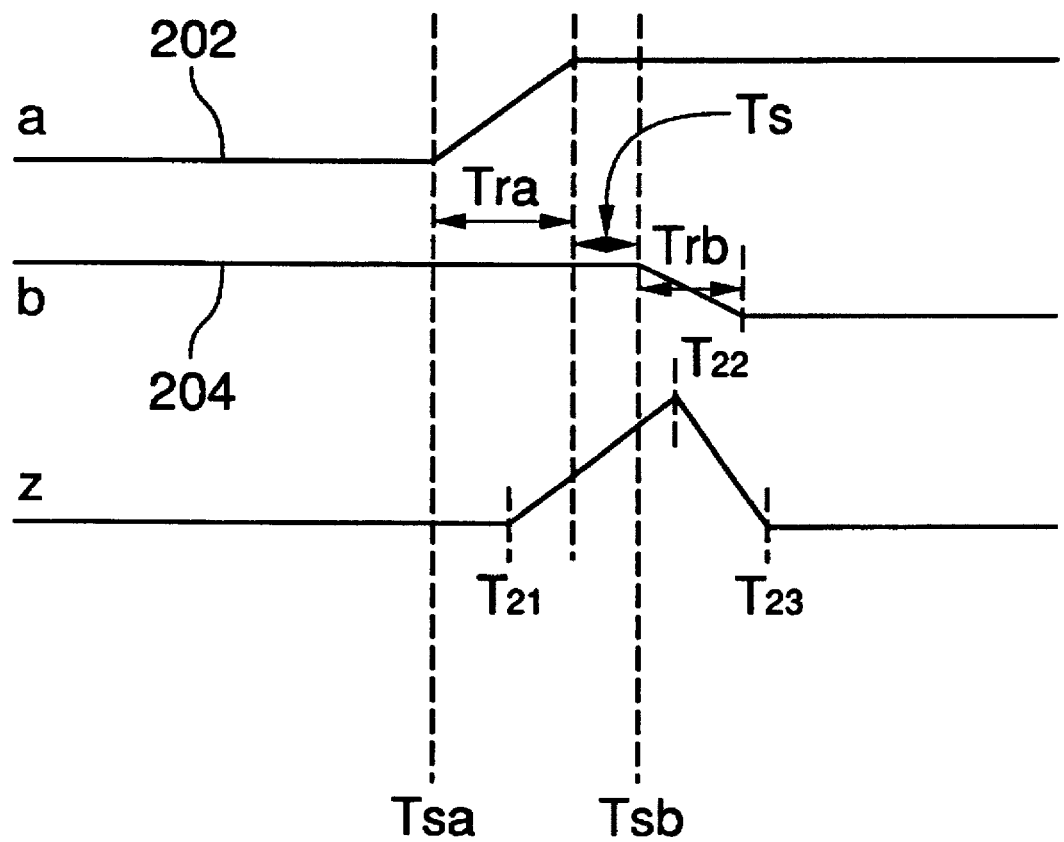
FIG. 2 shows a timing diagram of a set of input and output signals used to illustrate an embodiment of the invention.

FIG. 2 shows a timing diagram for a glitching arc ab:01——>10 applied to the logic gate 100. As seen, signal 202, applied to input a, begins to ramp from 0 to 1 at time Tsa. As signal 202 propagates through logic gate 100, it causes output z to begin to rise at time Tz1. As output z begins to change state, input signal 204, applied to input b, begins to ramp from 1 to 0. Signal 204 propagates through logic circuit 100, causing output z to begin to ramp back to logic level 0 at time Tz2 and finally settle to 0 at time Tz3. Therefore, it is seen that at the end of the glitching arc, output z remains at logic level 0, with only a transient change of state during the time period from Tz1 to Tz3.

The parameters discussed above are used to generate a model which characterizes the glitch power of the logic circuit. In one aspect of the invention, the logic circuit, for purposes of glitch power analysis, is modeled by collapsing the ramp times and the arrival times of the changing inputs into single parameters. This greatly reduces the amount of data to be stored as computer readable information.

To develop the model, the characterization parameters must be described mathematically to allow for computer manipulation. The first parameter is simply the capacitive load at the glitching output and will be denoted "cload" in the following expressions. The second parameter is the sum of the ramp times of the changing inputs and is denoted "tw". The ramp times for signals 202 and 204 are illustrated in FIG. 2, as Tra and Trb, respectively. Therefore, in this embodiment, tw is determined by the following expression:

$tw=Tra+Trb$.

The third parameter is the separation time of the changing inputs which is also illustrated in FIG. 2 and denoted "ts". The separation time ts is described mathematically according to the following equation:

$ts=Tsb-(Tsa+Tra)$.

Having defined the above parameters, it will be appreciated that there are two distinct limits to the glitching power. One limit corresponds to the slope and ramp times of signal 202 changing very early relative to the slope and ramp times of signal 204. The other limit corresponds to the slope and ramp times of signal 204 being very early compared to the slope and ramp times of signal 202. In one case, the output glitches completely to a different logic state, while in the other case the output does not glitch at all.

Since the currents involved in glitch currents consist mainly of the switching currents of the output, and possibly internal nodes and short circuit currents, it may be assumed that the two currents limits mentioned above are dependent only on the sum of the durations of the average switching threshold voltages of the NMOS and PMOS transistors, Vtn, Vtp respectively, for the given technology. The underlying assumption is that the two glitching paths have similar electrical characteristics, and hence have similar short circuit currents under identical Vtn–Vtp windows. Also, it is assumed that the average short circuit current is the same of 0 to 1 and 1 to 0 transitions when the Vtn–Vtp time window remains the same. Since the Vtn–Vtp is a constant fraction of a given rise/fall time of a changing input, we can deduce this characterization variable to be the sum of the ramp times of the two changing inputs. Also, between the two limits of the average currents, there is a smooth transition dependant on the separation of the changing inputs. This is defined as the separation time described above. Therefore, according to an aspect of the invention, the model comprises a 3-dimensional table of average currents multiplied by a time interval. Each entry in the table of the average currents multiplied by a time interval is taken with respect to specific values of cload, tw and ts. Once the table is created and stored in a computer-readable medium, such as RAM memory, simple linear interpolation is used to derive the glitch power for an actual set of parameters, i.e., a set of parameters of particular interest to a circuit designer.

Of course, the number of points contained within the 3-dimensional table depends on how many values are chosen for cload, tw and ts as previously stated. The more values which are chosen, the more accurate the model will be. Once the 3-dimensional table is generated, then determining the glitch power consumption for an actual logic gate becomes a matter of interpolating the 3-dimensional table with actual values for cload, tw and ts. To illustrate, assume that the glitching arc a–b:01–>10 is to be analyzed for the circuit of FIG. 1. Assume further that cload equals 50 fantofarads ("ff"), tw equals 2.0 nanoseconds ("ns"), and ts is allowed to vary over the range: –4.3 ns<=ts<=2.3 ns. Also, three pairs of values of Tra/Trb will be considered for tw: Tra, Trb=(0.1 ns, 1.9 ns), (1.0 ns, 1.0 ns), and (1.9 ns 0.1 ns). Therefore, for each specific value of ts, there will be three values of average current considered, each value corresponding to a Tra/Trb pair.

Figure 3A:
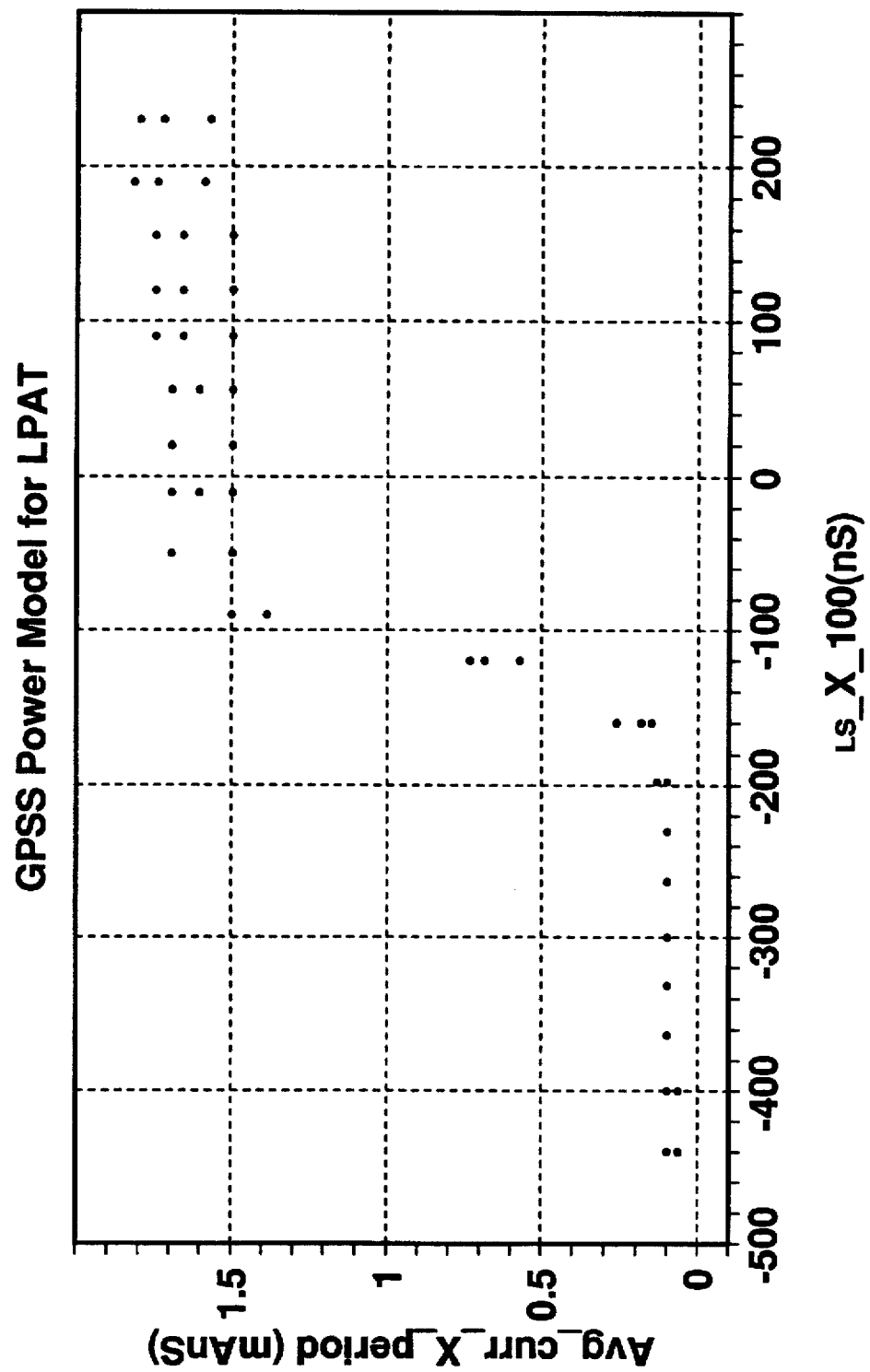
FIGS. 3A–3B are graphs of the glitch power consumed in a logic cell as calculated according to embodiments of the present invention.
Figure 3B:
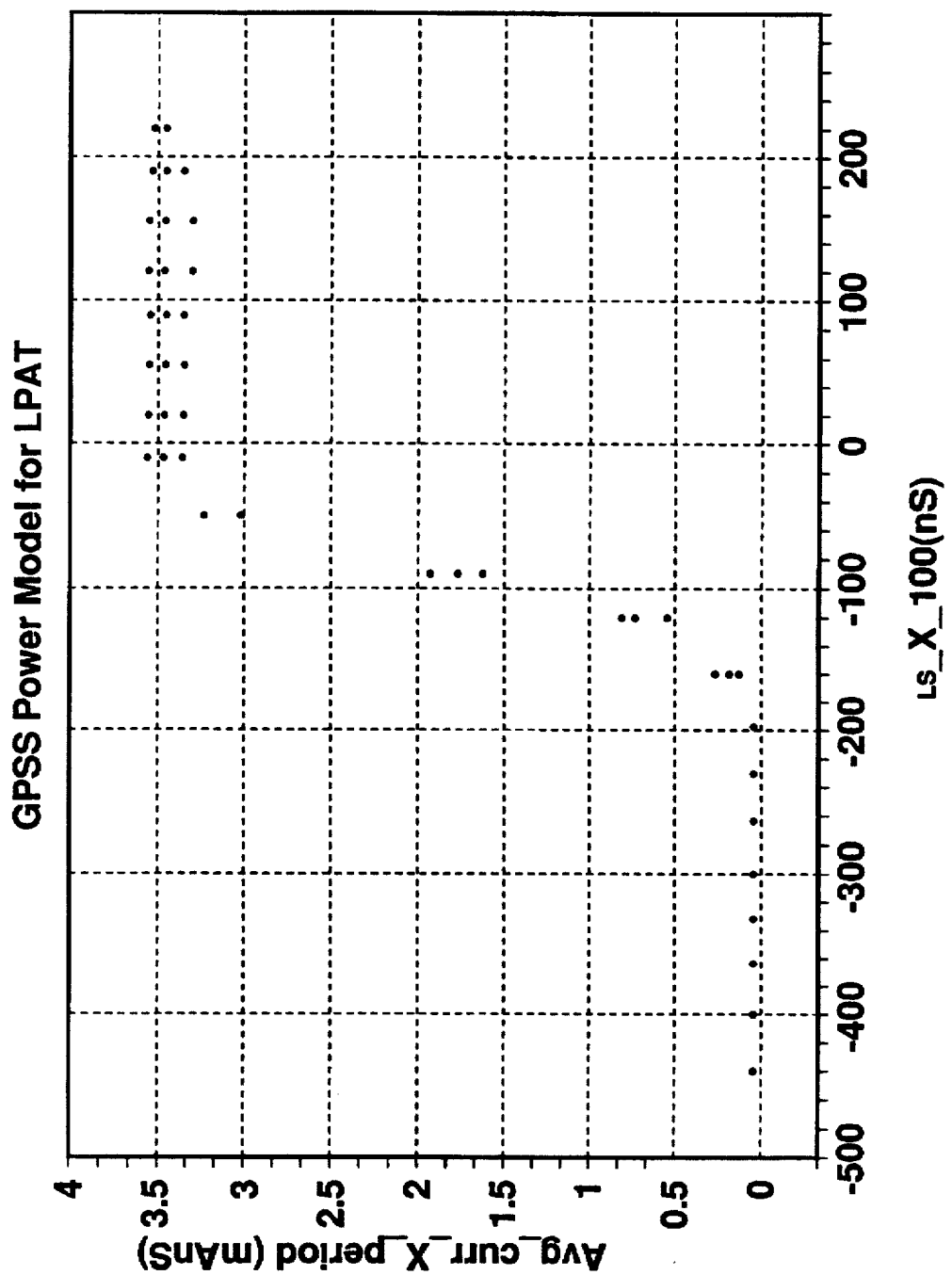

These parameters are then provided to a circuit analysis program such as SPICE, and the average current values are calculated according to the SPICE circuit model corresponding to the circuit shown in FIG. 1. Next, assume the value of cload is changed to 500 ff, and the results are re-calculated with the same parameters. The glitch power, expressed as an average current over a time period (mAnS), of a specific logic gate, i.e., the LSI Logic NAND gate cell nd2c, available from the LCB 500K library, is graphed in FIGS. 3A and 3B for load values of 50 ff and 500 ff respectively.

In order to make these results available for interpolation, it is necessary that they be stored in a computer-readable memory in a suitable data structure. A representation of such a data structure is shown in FIG. 3C. Once the result is then calculated and stored as shown, linear interpolation is used to determine the glitching power for the circuit of FIG. 1 or any combination of cload, tw and ts of interest to a circuit designer.

The choice of range of ts is important and should just cover the transition between the two boundary values discussed earlier. If the range of input ramp times ("Tr") is considered to be $Tr\_min<=Tr<=Tr\_max$, then for a given tw and cload, it is possible to determine the range of characterization for ts according to the following expression:

$ts\_max = a\_to\_z(cload, tw-Tr\_min)-b\_to\_z(cload, Tr\_min)+0.5(tw-Tr\_min)$, and $ts\_min = -1.0(b\_to\_z(cload, tw-Tr\_min)-a\_to\_z(cload, Tr\_min)+0.5(tw-Tr\_min))$ where $a\_to\_z$ and $b\_to\_z$ represent the propagation delay time from a signal received at inputs a and b to the output z, respectively.

To further illustrate the invention, further models were generated for the nd2c circuit which is a NAND gate taken from the lcb500k library available from LSI Logic Corporation. The following parameters were chosen based upon information contained in the nd2c Data Sheet:

Vdd=3.3 volts
Temperature=25° C.
Process equals nominal, i.e., BSIM500KNOM
cload_min: 50 ff
cload_max: 500 ff
Tr_min: 0.10 ns
Tr_max: 2.00 ns
tw_min: 0.5 ns
tw_max.: 4.0 ns In this case, since minimization of data and runtime were not a priority, the absolute minimum and maximum path delays were used to calculate ts_min and ts_max according to the following expressions:

$ts\_max=a\_to\_z(cload\_max, Tr\_max)-b\_to\_z(cload\_min, Tr\_min)+0.5(Tr\_max)$, and $ts\_min=-1.0(b\_to\_z(cload\_max, Tr\_max)-a\_to\_z(cload\_min, Tr\_min)+0.5(Tr\_max))$ The number of values of ts in this embodiment was chosen to be 20. However, this number is somewhat arbitrary, and finer or coarser values of ts may be chosen depending on the accuracy required for the designer's particular application. Therefore, in this case, ts_min is incremented by the value of ts_step for each calculation, where ts_step is defined as:

$ts\_step=(ts\_max-ts\_min)/19$.

For each tw, three pairs of ramp times (Tra, Trb) were chosen:

Tra, Trb=(Tr_min, tw-Tr_min), (tw/2, tw/2), and (tw-Tr_min, Tr_min).

Based upon the above equations, a data sweep file was generated, a portion of which is shown in FIG. 4. The data sweep file supplies parameters to the circuit analysis tools as illustrated in the task flow chart of FIG. 6. Having generated the necessary parameters, the glitch power for each combination of parameters is now calculated. For this, circuit analysis tools are used, for example, SPICE. A SPICE deck corresponding to this embodiment is shown in FIG. 5.

The glitch power generated for the parameters is stored in a data structure similar to that described previously and is readily available for linear interpolation to analyze the glitch power of the nd2c circuit for any combination of the above parameters.

In another aspect, the invention lends itself to a method for generating standardized models, the accuracy of each model being selectable by a designer based upon the desired model level. Specifically, the characterization window for a given cell is provided as follows: cload_min<=cload<= cload_max, and Tr_min<=Tr<=Tr_max.

In one version, the model defaults to four tw points, four cload points and ten ts points. Of course, the number of points can be chosen differently than the default values if such other values would be more appropriate in a particular application. Using these default values, the following parameter expressions are appropriate:

cload_step=(cload_max−cload_min)/3
tw_min=4 tr_min
tr_max=2 tr_max
tw_step=(tw_max−tw_min)/3, and
ts_step=(ts_max−ts_$_{min}$)/10 where ts_max and ts_max are calculated as described above.

With these parameters defined as above, then a first model can be generated in which, for each combination of tw, ts, cload, the ramp times tra and trb are chosen such that tra=trb =tw/2.0. Therefore, the total number of glitch power points calculated by the SPICE program is 160. This model (referred to as "GPSS1") is especially suitable for single stage combinational cells.

In another, more detailed, embodiment, for each combination of tw, ts, cload, two values of two pairs of ramp times are calculated for each tw. These values are (Tr_min, tw−Tr_min), and (tw−Tr_min, Tr_min). In this case the total number of data points is 320. This model (referred to as "GPSS2") is especially suitable for all two-stage combinational cells and three-stage cells without transmission gates.

In still a further embodiment, for each combination of tw, ts, and cload, three values of characterized gate at qdd representing three pairs of tra and trb are provided. These are: (Tr_min, tw−Tr_min), (tw/2.0, tw/2.0) and (tw−Tr_T min, Tr_min). In this case, the total number of data points will be 480. This model (referred to as "GPSS3") is especially suitable for all other combinational cells.

A next level of GPSS model, e.g. GPSS4, can be defined based on power accuracy requirements and the complexity of the combinational cell.

Figure 6:
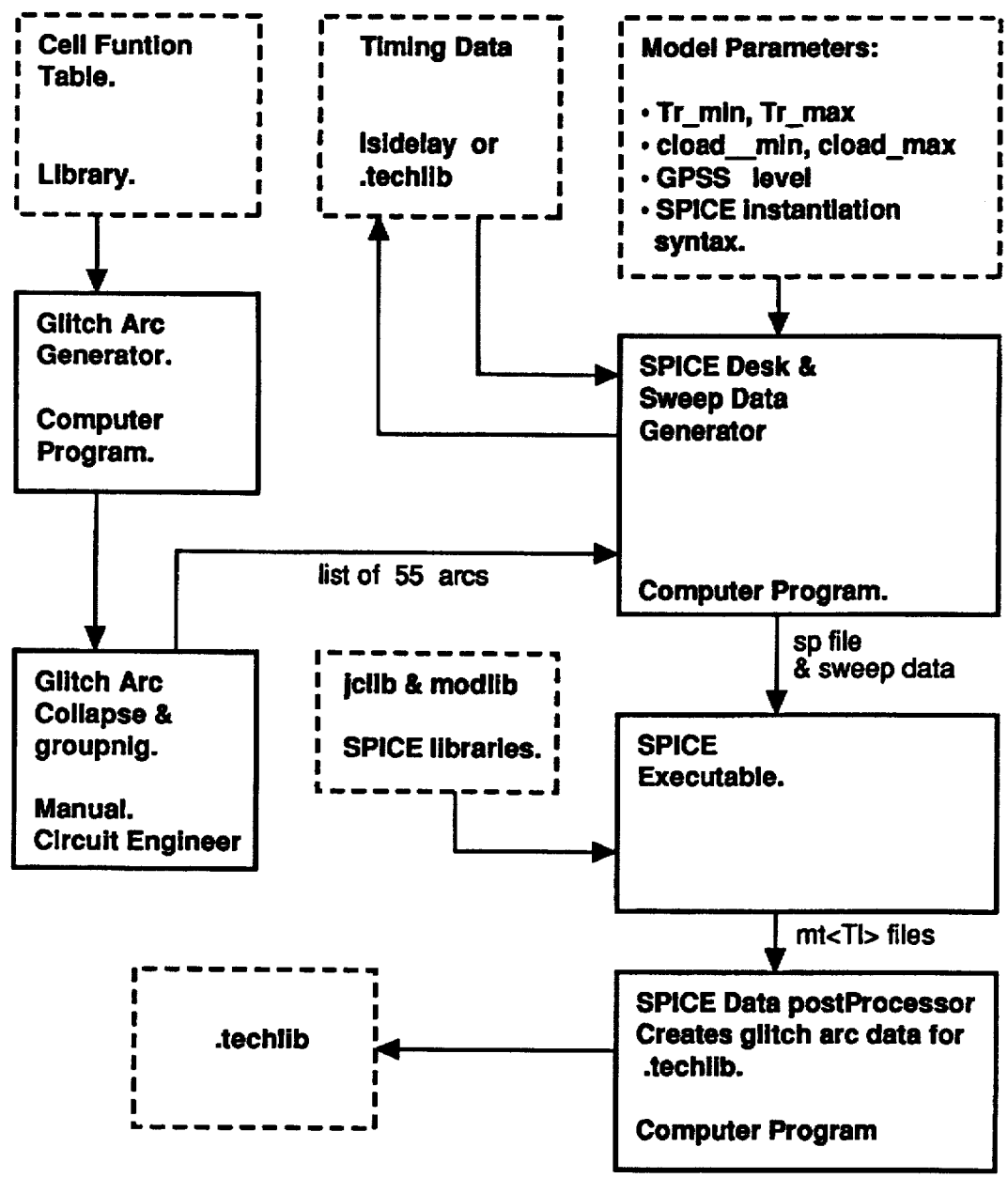
FIG. 6 is a task flow chart illustrating the steps required to generate a glitch power model according to an embodiment of the invention.

FIG. 6 illustrates a task flow model for GPSS model featurization. This figure shows the steps required in one embodiment of the invention to successfully link appropriate libraries, along with the parameters and SPICE deck, in order to generate the glitch power according to an embodiment of the invention.

The above-described embodiments are for purposes of illustration only, and they are not intended to limit the scope of the invention. Other equally effective embodiments may occur to those of skill in the art without departing from the scope and spirit of the present invention.

What is claimed is:

1. A method for determining glitch power in a logic circuit having a power supply terminal, a first input, a second input, and an output coupled to a capacitive load, the method comprising:

determining at least one ramp time sum, each ramp time sum corresponding to a pair of ramp times;

determining a plurality of separation times by:
   selecting a minimum separation time,
   selecting a maximum separation time,
   dividing a difference between the minimum separation time and the maximum separation by a step value to determine a separation time increment,
   incrementing the minimum separation time by multiples of the separation time increment until the incremented minimum separation time approximately equals the maximum separation time;

determining an average current flowing through the power supply terminal for each separation time and ramp time sum;

storing the average current in a computer-readable medium; and interpolating an actual average current from the stored average current values based upon actual ramp times and an actual separation time.

2. A method as in claim 1 wherein one of the ramp time pairs comprises a pair of equal ramp times, each ramp time being half of the ramp time sum.

3. A method as in claim 1 wherein one of the ramp time pairs comprises a minimum ramp time and a maximum ramp time.

4. A method as in claim 3 wherein selecting a minimum separation time comprises calculating the minimum separation time in accordance with the following expression:

$$ts\_min=-1.0\ (b\_to\_z(cload,\ tw\_Tr\_min)-a\_to\_z(cload, Tr\_min)+0.5(tw-Tr\_min))$$

where ts_min represents the minimum separation time, tw represents the ramp time sum, Tr_min represents the minimum ramp time, a_to_z represents the path delay time for a signal received at input a of the logic gate and b_to_z represents the path delay time for a signal received at input b of the logic gate.

5. A method as in claim 3 wherein selecting a maximum separation time comprises calculating the maximum separation time in accordance with the following expression:

$$ts\_max=a\_to\_z(cload,\ tw-Tr\_min)-b\_to\_z(cload,\ Tr\_min)+ 0.5\ (tw-Tr\_min)$$

where ts_max represents the maximum separation time, tw represents the ramp time sum, Tr_min represents the minimum ramp time, a_to_z represents the path delay time for a signal received at input a of the logic gate and b_to_z represents the path delay time for a signal received at input b of the logic gate.

6. A method as in claim 1 wherein determining an average current flowing through the power supply terminal for each separation time comprises providing at least one of the ramp time pairs and the capacitive load to a computer encoded with an electronic circuit analysis program.

\* \* \* \* \*